Figure 1:
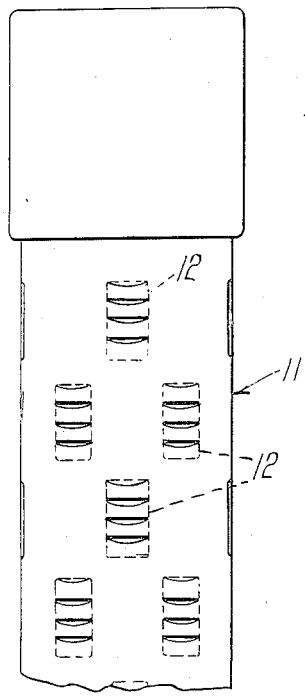

O. A. LAYNE.
SEPARATOR FOR WELLS.
APPLICATION FILED SEPT. 17, 1917.

1,268,366.

Patented June 4, 1918.
2 SHEETS—SHEET 1.

Inventor
Ollyn A. Layne,
by James T. Bartelow
his Attorney.

O. A. LAYNE.
SEPARATOR FOR WELLS.
APPLICATION FILED SEPT. 17, 1917.
1,268,366.
Patented June 4, 1918.
2 SHEETS—SHEET 2.
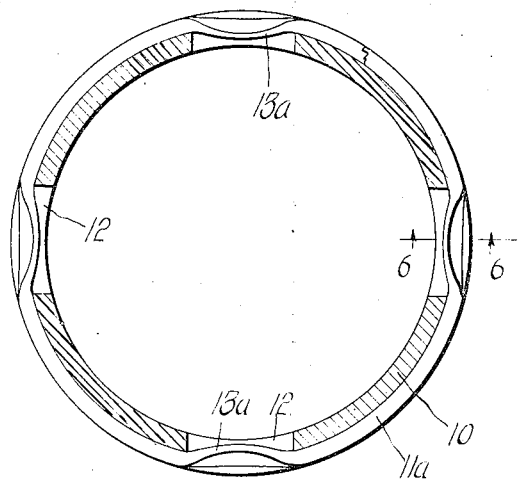
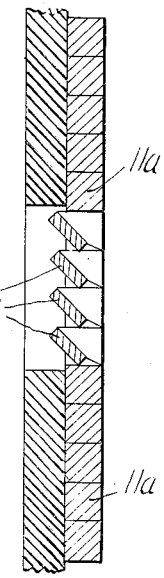
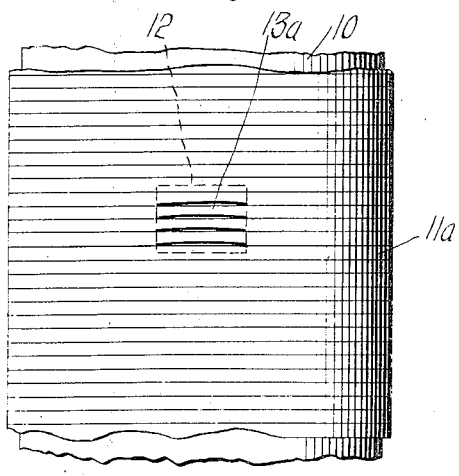
Inventor
Ollyn A. Layne,
by James T. Barkelew
his Attorney.

UNITED STATES PATENT OFFICE.

OLLYN A. LAYNE, OF LOS ANGELES, CALIFORNIA.

SEPARATOR FOR WELLS.

1,268,366.  Specification of Letters Patent.  Patented June 4, 1918.

Application filed September 17, 1917. Serial No. 191,678.

*To all whom it may concern:*

Be it known that I, OLLYN A. LAYNE, a citizen of the United States, residing at Los Angeles, in the county of Los Angeles, State of California, have invented new and useful Improvements in Separators for Wells, of which the following is a specification.

This invention relates to separators for well pipes or well casings; and relates to that class of separators sometimes known as screens.

It has been common to provide perforated lengths of casing to screen out the sand from the oil entering the casing, or to prevent entry of sand while allowing entry of fluid. Such perforated pipes or casings have been provided in various forms; and one of the most successful forms embodies a formation made by horizontally slitting the casing and then displacing the portions between the slits so as to form openings between the adjacent displaced members through which openings the fluid flows more or less upwardly to enter the casing. In such a formation of device inward flow of sand is prevented and the sand, etc., is thus excluded from the casing. However, in all such formations of separators there is a disadvantage inherent in the laterally displaced structure, in that either the outer surface or inner surface, or both surfaces of the casing, are made rough and irregular; so that the casing has a tendency to gather earth on its exterior, and the displaced members may become broken or deformed by contact with the strata or by contact of tools on the inside. Tools are heavy and a blow from them will either deform the displaced portions or break them out entirely so that the separator will then fail to perform its function.

It is an object of this invention to provide a construction whereby such a separator may be made with smooth surfaces both interiorly and exteriorly. I accomplish this object by providing preferably a double wall casing; or, in practice, a casing surrounded by an exterior sheathing. One of the double walls, preferably the outer sheathing, has the slitted and displaced parts and the other has apertures or openings in which the displaced parts stand, these openings being preferably in the interior casing. The displaced parts stand substantially entirely within said openings and between the inner surface of the inner wall and the outer surface of the outer wall; so that the finished structure presents a smooth inner and outer surface unobstructed by any projecting parts.

Figure 2:
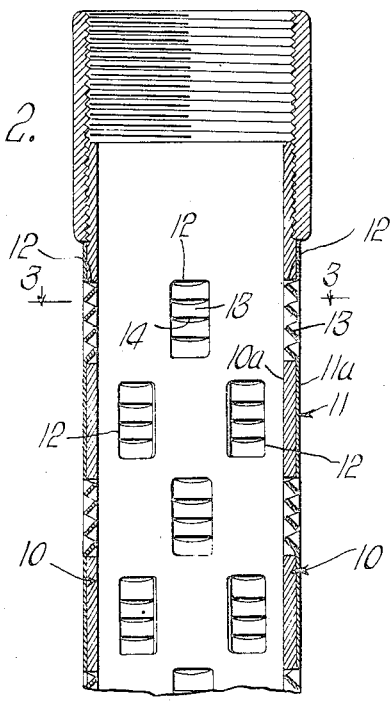
Figure 3:
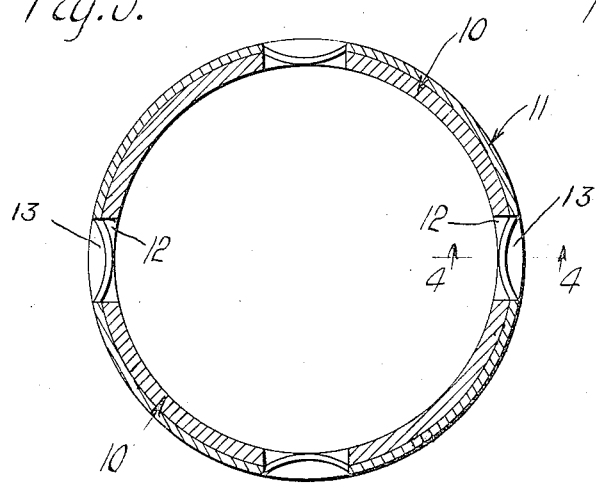
Figure 4:
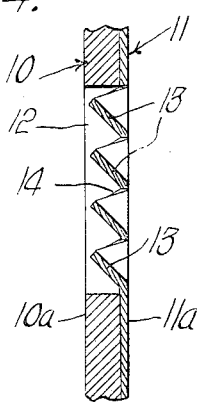

The other objects and features of my invention will be understood by the following detailed description, reference being had to the accompanying drawings in which Figure 1 is an exterior elevation of my separator; Fig 2 is a vertical longitudinal section of the same; Fig. 3 is an enlarged cross section taken on line 3—3 of Fig. 2; Fig. 4 is an enlarged section taken on line 4—4 of Fig. 3; Fig. 5 is a cross section of a modified form of device; Fig. 6 is a longitudinal section on line 6—6 of Fig. 5; and Fig. 7 is an elevation of the modified form.

In the drawings I show an inner casing or pipe at 10 surrounded by an outer sheathing at 11, the pipe and sheathing being in nesting relation to each other. Now, although I herein show and describe the inner pipe 10 as having openings and apertures and the outer sheathing 11 as having the displaced parts, it will be fully understood that this particular relation is not necessary to my invention, although I now find it a practical relation. Neither is it necessary that the inner member be a relatively heavy pipe while the outer member is a relatively light sheathing. The two parts may be of equal weight, or the outer part may be the heavier; but I find at present that the particular arrangement herein illustrated is one that lends itself readily to economical manufacture and efficient use.

I preferably utilize any ordinary well pipe or casing for the interior member 10, and provide this well pipe or casing with openings 12 through its walls, said openings being spaced according to any design or arrangement and being preferably oblong in shape. The outer sheathing is, at places registering with the opening 12, provided with displaced portions 13. These displaced portions 13 may be formed in any desired manner, in such a way as to leave openings 14 between said portions, and in such a way as to put the displaced portions into the openings 12. In a preferred structure I horizontally slit the sheathing 11 and then displace the intermediate portions inwardly to an angular position into the opening 12. The displaced portions form such a strainer or separator as is described in Patent 1,001,655, dated August 29, 1911, to M. E. Layne. Each of the displaced portions 13 inclines downwardly and outwardly; so that the lower edge of each portion is outside the upper edge of the portion immediately below. A sort of shutter construction is thus made through which the fluid flows more or less upwardly to obtain access to the casing's interior; and the sand is thus excluded from the casing, because the downward angle at which the sand will flow is greater than any angle of flow possible through the slitted openings.

The displaced portions lie substantially entirely between the interior surface 10ª of the interior casing and the outer surface 11ª of the outer sheath; so that the portions 13 are entirely protected by being located within the openings 12 and the finished structure presents an unobstructed interior and exterior. The drilling tools may be drawn up and down within such a casing without any liability whatever of striking the strainer members and there is no obstruction to the lowering of such a casing through or in contact with the earth. The strainer members are consequently always in efficient operative condition when their final position in the well is reached.

As I have hereinbefore stated, my invention is not limited to the apertured member being innermost and the sheathing or the like being outermost; the invention is contained in the general arrangement of the two tubular members one having apertures and the other having parts displaced into those apertures. Furthermore, the member having the displaced parts is not necessarily a sheathing of sheet metal or the like; it may be formed in other manners, such, for instance, as is shown in Figs. 5 to 7. Here I show a casing 10 surrounded by a tubular member formed by a winding of wire 11ª, wound closely around the whole pipe. Where this wire winding crosses the openings 12 it is flattened and displaced to the position shown at 13ª in Fig. 6. A strainer of the same kind as before described is thus formed.

Although I have explained specific forms of my invention in some detail I do not thereby limit my invention to such details, intending this specification to be indicative of the invention rather than a limitation upon it. The following claims are therefore directly primarily to the broader aspects of my invention, as herein stated, including the means herein generally described for making such strainer construction without interior or exterior projections.

Having described a preferred form of my invention, I claim:

1. A well separator, embodying the combination of two tubular members in nesting relation, one of said members having openings in its walls, and the other having openings formed therein by displacement of parts, said parts being displaced into the openings in the first mentioned member.

2. A well separator, embodying an inner and an outer tubular member, the inner member having wall openings and the outer member having separator openings formed by displacement of parts of its wall into the openings in the inner member.

3. A well separator, embodying an inner pipe with openings through its wall, and outer sheathing having slitted parts over the openings, and the portions of the sheathing between the slits being displaced into the openings.

4. In a well separator, in combination with a casing having slitted and displaced parts, another casing in nesting relation and having openings registering with the slitted and displaced parts, said parts being displaced into said openings.

5. In a well separator, in combination with an exterior casing having slitted and displaced parts, an interior casing nesting within the other and having openings registering with the slitted and displaced parts, said parts being displaced inwardly into the openings to lie substantially wholly between the outer surface of the exterior casing and the inner surface of the interior casing.

6. In a well separator, in combination with a casing having openings formed therein by displacement of parts of its walls from the normal wall plane, another casing in nesting relation and having openings registering with the displaced parts, said parts being displaced into said openings.

7. A well separator, embodying an inner pipe and an outer sheathing, the pipe having openings through its walls, and the sheathing having openings formed by slitting and displacing parts over the pipe openings, the displaced parts being displaced inwardly into said openings.

8. A well separator, embodying an inner pipe and an outer sheathing, the pipe having openings through its walls, and the sheathing having openings formed by horizontal slitting and displacement of parts between the slits, over the pipe openings, said displaced parts being displaced inwardly into said pipe openings, and said displaced parts lying wholly between the inner surface of the pipe and the outer surface of the sheathing.

OLLYN A. LAYNE.

Witness:
E. WAGNER.